UNITED STATES PATENT OFFICE.

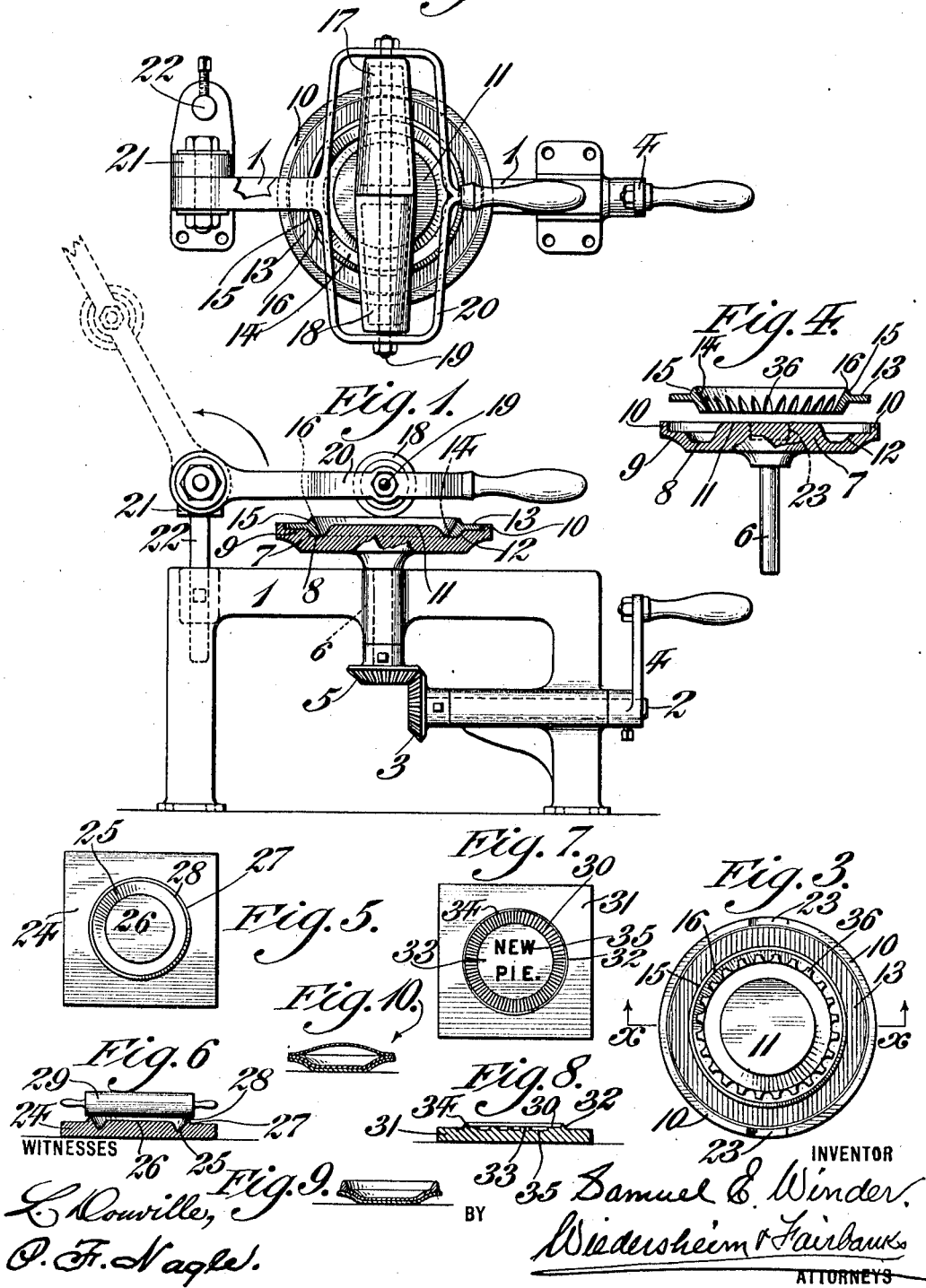

SAMUEL E. WINDER, OF WALTHAM, MASSACHUSETTS, ASSIGNOR OF ONE-HALF TO WILLIAM L. CARNEY, OF WALTHAM, MASSACHUSETTS.

PIE-CRUST MOLDING AND ROLLING DEVICE.

1,035,065.     Specification of Letters Patent.     Patented Aug. 6, 1912.

Application filed March 28, 1912. Serial No. 686,841.

*To all whom it may concern:*

Be it known that I, SAMUEL E. WINDER, a citizen of the United States, residing in the city of Waltham, county of Middlesex, State of Massachusetts, have invented a new and useful Pie-Crust Molding and Rolling Device, of which the following is a specification.

My invention relates to a new and useful pie crust molding and rolling device, and consists in providing means for receiving the dough, means for cutting off the surplus dough, and means for imparting relative, rotary movement between the cutting means.

It further consists in providing a support for the dough with a removable former surrounding the same, and having a cutting edge with means adapted to coact with said cutting edge, and means for imparting relative, rotary movement between said cutting edge and coacting means.

It further consists of a former provided with a dough supporting surface, and with a projection around the surface, having a cutting edge extending above the plane of the surface with a groove between the projection and the dough supporting surface.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a partial side elevation, partial sectional view of a pie crust molding and rolling device embodying my invention. Fig. 2 represents a plan view thereof. Fig. 3 represents a plan view of a portion of the device in detached position showing a former provided with serrations. Fig. 4 represents a sectional view on line *x—x*, Fig. 3, with the parts in separated position. Fig. 5 represents a plan view of another construction of a former. Fig. 6 represents a sectional view thereof showing a roller coacting with the cutting edge. Fig. 7 represents a plan view of another construction of former. Fig. 8 represents a sectional view of another construction of former. Fig. 9 represents a sectional view showing a pie crust in position on a pie plate. Fig. 10 represents a sectional view showing upper and lower pie crusts in position on a pie plate.

Similar numerals of reference indicate corresponding parts in the figures.

Referring to the drawings:—1 designates the frame of a pie crust molding and rolling device, in which frame is suitably mounted, a shaft 2 to one end of which is connected a gear 3 and to the opposite end of which is connected an operating handle 4.

5 designates a gear meshing with the gear 3, and which is suitably connected with a pin or rod 6 carrying a head or carrier 7, said pin 6 being suitably journaled in the frame 1, and said head being adapted to have a suitable portion thereof rest on the frame 1 and to rotate thereon. The said head or carrier 7 is provided with a suitably formed groove 8 and with a shoulder 9 from which, extending upwardly and around the same, is a flange 10, and said head also carries a dough support or surface 11.

12 designates a crimping ring or former, a suitable portion of which is adapted to be seated in the groove 8, and which is provided with a flange 13 adapted to rest upon the shoulder 9 of the said head. The inner wall 14 of said former is preferably inclined and said former is provided with a projection 15 having a cutting edge 16 which extends, when the former is in position on the carrier or head, a suitable distance above the plane of said supporting surface 11.

It will be noted more particularly from Fig. 1 that a suitable space is provided between the side wall of the supporting surface and the inner wall of the crimping ring or former. I desire to provide means to coact with the cutting edge 16 of the former to cut off the surplus dough and to this end, I provide a roller or rollers. As shown in the drawings, 17 and 18 designate the rollers which are suitably mounted in order to be brought into contact with the cutting edge 16 of the former and to be removed therefrom, and, in the present instance, I have mounted said rollers upon a shaft 19 carried by a frame 20, which, in the present instance, is pivotally mounted at a suitable point with respect to the frame 1. As here shown, the said frame 20 is pivoted to a bearing 21 carried by a rod 22, which is adjustably mounted in the frame 1 in order that the vertical position of the rollers 17 and 18 may be adjusted, as desired. It will be understood that the said frame 20 is suitably connected with the bearing 21 in order to provide sufficient friction between the parts so that the said frame 20 and the rollers 17 and 18 carried thereby, will be held in any position to which the frame may be placed by the operator, until moved again.

The operation of the device is as follows:—The frame 20 and rollers 17 and 18 are moved to a position away from the head 7, for example, to the position seen in dotted lines, Fig. 1. The former or crimping ring 12 is now placed in the groove 8 of the carrier or head, and sufficient dough is placed upon the supporting surface 11 and within the former, after which the operator, by turning the handle 4 through the medium of the gears 3 and 5, will cause the head 7 to revolve or rotate. The frame 20 is then pulled down or moved in order to bring the rollers 17 and 18 into contact with the dough, in order to compress the same properly within the desired space and roll out the dough, and when the space between the supporting surface, the groove and the former 12 is full, the said rollers 17 and 18 will cut or pinch off the surplus dough by contacting with the cutting edge 16. The frame 20 is now raised, and a pie crust will be formed, inverted, which will be of the size of the supporting surface 11, for the inside of the crust, and the size of the former or crimping ring 12 for the outside. A pie plate may now be placed upon the surface of the dough in inverted position and the operator by lifting the former or crimping ring 12 and the pie plate and turning them over, is enabled to lift off or remove the crimping ring and the dough will settle in the pie plate conforming to the shape thereof, forming a perfect crust, as is best understood from Fig. 9. In order to permit of ease of removal in the former or crimping ring, I have provided cutaway portions or notches 23 in flange 10, in order that the operator can grasp the said ring or former. This will enable him to secure a hold on the former or crimping ring with his fingers when he places the pie plate on the top of the crust and which plate he can hold down with his thumb on each side. The crimping ring or former, after being removed from the pie crust, can be replaced in the head 7, ready for the next operation.

In the construction shown in Figs. 5 and 6, I have provided a former formed of a base or body portion 24 provided with a suitably formed groove 25, which surrounds the dough supporting surface 26, and said plate is provided with a projection 27 around the groove and which is provided with the cutting edge 28 extending above the plane of the said supporting surface. By placing dough within the groove 25 and upon the dough supporting surface 26 and applying an ordinary roller 29 thereto, it will be understood that the dough will be suitably forced into the space provided by the projection, the dough supporting surface and the groove, while the surplus dough will be cut off by contact of the roller 29 with the cutting edge 28, the effect of which is evident.

In Figs. 7 and 8, I have shown a base 31 provided with a projection 32 surrounding a dough supporting surface 33, said projection being provided with a cutting edge 34 extending above the plane of the supporting surface, and I have formed crimps or serrations 30 on said surface 33 to form corresponding crimps on the pie crust, and I have further provided depressions in the dough supporting surface which can be in the form of letters, numerals, or any other devices, into which depressions the dough is forced in order that the crust of the pie will be provided with notations to correspond, it being thus understood that the said depressions thus form dies for marking the pies. In the construction seen in Figs. 3 and 4, I have shown the inner wall of the former or crimping ring provided with serrations or crimps 36 for imparting similar marking on the pie.

Having thus described my invention, what I claim as new and desire to secure by Letters Patent, is:—

1. In a device of the character stated, the combination of a support for the dough, a removable former encircling said support and having an annular cutting edge, means for pressing the dough and coacting with said cutting edge for severing the surplus dough, and means for imparting relative rotary movement between said cutting edge and said coacting means said former being adapted to be removed with the dough from the support.

2. In a device of the character stated, the combination of a support for the dough, a removable former encircling said support and having an annular cutting edge, a roller adapted to be brought into contact with said cutting edge, and means for imparting relative rotary movement between said cutting edge and said roller said former being adapted to be removed with the dough from the support.

3. In a device of the character stated, the combination of a rotatably mounted head carrying a support for the dough, a removable former carried by said head, encircling said support and having an annular cutting edge, a roller adapted to be brought into contact with said cutting edge, and means for imparting rotary motion to said head said former being adapted to be removed with the dough from the support.

4. In a device of the character stated, the combination of a support for the dough having downwardly inclined side walls, a removable former encircling said support and having an inclined inner wall forming a space with the inclined wall of said support, a cutting edge on said former extending above said support, means coacting with said cutting edge for severing the surplus dough, and means for imparting relative rotary movement between said cutting edge and said coacting means.

5. In a device of the character stated, the combination of a rotatably mounted head carrying a support for the dough, a removable former carried by said head, encircling said support and having a cutting edge, rollers adapted to be brought into contact with said cutting edge, and means for imparting rotary motion to said head.

6. In a device of the character stated, the combination of a support for the dough having downwardly inclined side walls, a removable former encircling said support and having an inclined inner wall forming a space with the inclined wall of said support, a cutting edge on said former extending above said support, and means for pressing the dough upon said support and into the said space and coacting with said cutting edge for severing the surplus dough.

7. In a device for molding the bottom of a pie in inverted position, the combination of a base having a groove therein, a supporting surface formed on said base and bounded by said groove with a removable former seated in said groove, and spaced from the wall thereof, and means for pressing the dough upon said supporting surface and into said groove and for severing the surplus dough.

8. In a device for molding the bottom of a pie in inverted position, the combination of a base having a groove therein, a supporting surface formed on said base and bounded by said groove with a removable former having a portion seated in said groove and spaced from the wall thereof.

9. In a device for molding the bottom of a pie in inverted position, a pie former consisting of a ring adapted to encircle a support, the openings at the top and bottom of said ring being of different diameters.

SAMUEL E. WINDER.

Witnesses:
ALFRED L. MOODY,
GEORGE E. REGAN.

---

Copies of this patent may be obtained for five cents each, by addressing the "Commissioner of Patents, Washington, D. C."